Oct. 2, 1951  G. W. SCHATZMAN  2,569,496
FENDER SHIELD MOUNTING
Filed Dec. 15, 1945  3 Sheets-Sheet 1

Inventor
GEORGE W. SCHATZMAN
by The Firm of Charles W. Hill
Attys.

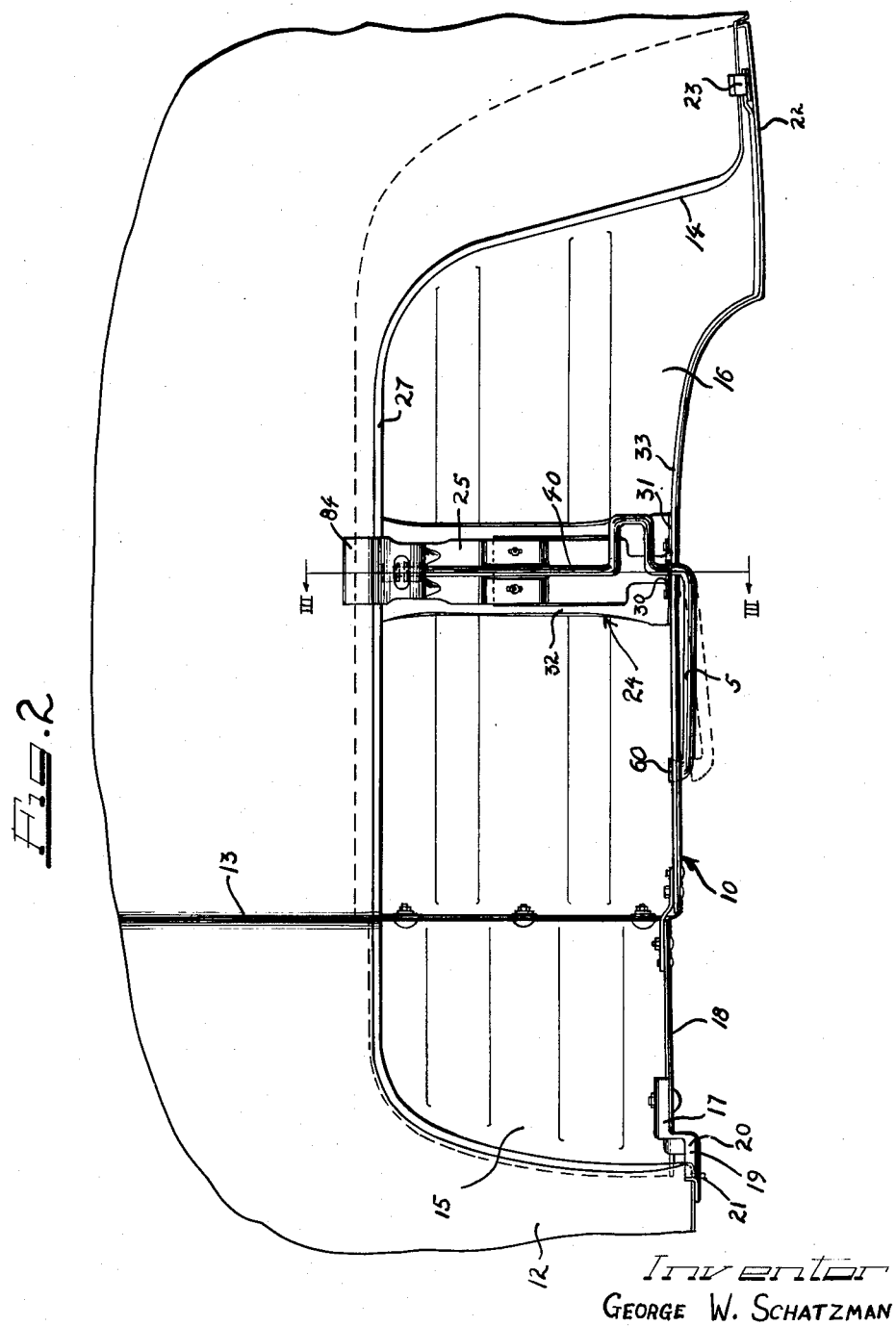

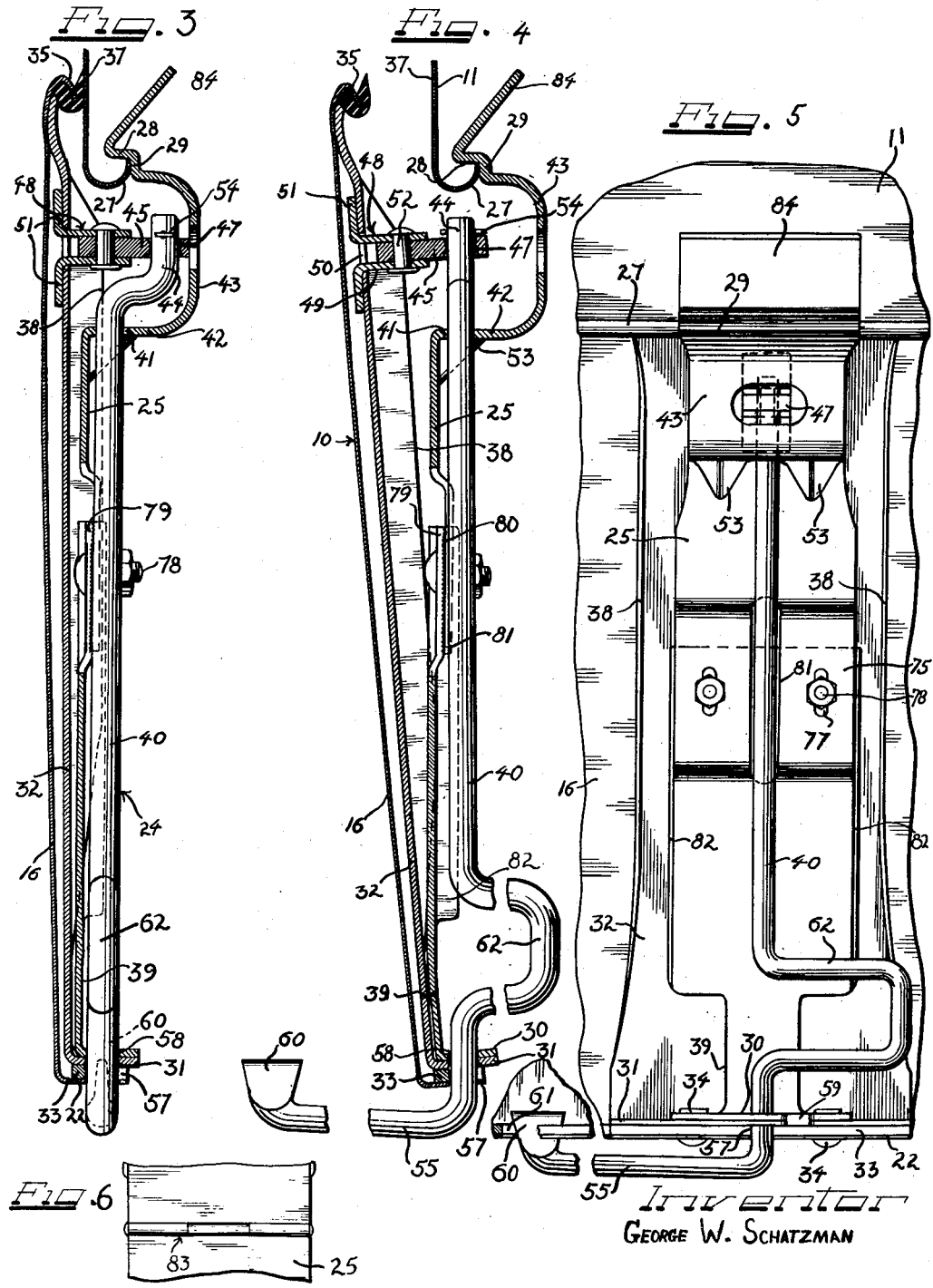

Patented Oct. 2, 1951

2,569,496

UNITED STATES PATENT OFFICE 2,569,496

FENDER SHIELD MOUNTING

George W. Schatzman, Detroit, Mich., assignor to Houdaille-Hershey Corporation, Detroit, Mich., a corporation of Michigan Application December 15, 1945, Serial No. 635,165

21 Claims. (Cl. 280—153)

This invention relates to a fender shield and a fender and shield assembly, and more particularly to new and improved means for securing a fender shield to a vehicle fender and to a novel cooperation of a fender and a fender shield.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Fender shields have been employed to improve the appearance of the vehicle body by substantially covering the wheel access opening in the vehicle fender.

As the term "fender shield" shall hereinafter be employed, it refers to any member which is adapted to be secured to a fender or other portion of the vehicle body for the purpose of covering the opening in the fender of a vehicle body which is provided for access to or removal of the vehicle wheel. Furthermore, as the term "fender" shall hereinafter be employed, it refers to any form of wheel fender in its broad sense, whether said fender be separate from the vehicle body, partially separated from the vehicle body, or actually an integral part of the vehicle body, and whether or not it projects outwardly away from the principal body portion of the vehicle.

One of the chief problems in the mounting of fender shields has been to attain a construction which requires a minimum of skill in assembling the fender shield with the fender or removing the fender shield and in which the mechanism involved in mounting the shield is simple, inexpensive to produce, and will be capable of withstanding the rigors of hard usage while remaining at all times in efficient working condition.

An important object of the present invention is to provide a fender shield which is adapted to be easily and quickly mounted with a minimum of manipulative effort and which is then adapted to be latched quite securely in position.

Another object of the invention is to provide improved latching means in a fender shield for clamping the fender shield in place on the fender.

Another object of the invention is to provide improved latching means in a fender shield whereby the fender shield is adapted to be hooked into position on the fender as a preliminary step in the mounting thereof on the fender.

Still another object of the invention is to provide a fender shield which is adaptable for use with fenders of varying dimensions, at least in certain portions of the fender.

Yet another object of the invention is to provide a latching mechanism for a fender shield which is of a simple and rugged construction adapting it for continuous efficient operation under even severely adverse conditions in use.

Other objects, features and advantages of the invention will be readily apparent from the following detailed description taken in connection with the accompanying three sheets of drawings, in which:

Figure 2 is an enlarged fragmentary rear elevational view of the fender and showing the fender shield on a larger scale;

Figure 3 is an enlarged vertical sectional detail view taken substantially along line III—III of Figure 2 and showing the fully closed condition of the latching mechanism;

Figure 4 is a similar vertical sectional view as Figure 3 but showing the various parts with the relationship assumed when the latching mechanism is open;

Figure 5 is an enlarged rear elevational view of the latching mechanism;

Figure 6 is a fragmentary rear elevational view of a slightly modified latch bar structure, showing a hinged arrangement;

Figure 1:
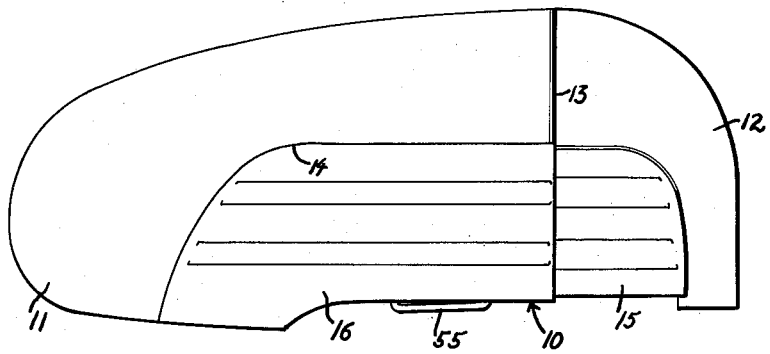
Figure 1 is a small scale side elevational view of a fender equipped with a fender shield embodying the features of the present invention.

Although it will be clearly apparent that the features of the present invention are adapted to be utilized in fender shields of various forms for use with various styles of fenders, I have chosen to show the invention, for purpose of illustration, in connection with a fender shield construction and assembly of the kind more particularly disclosed and covered in the Ferguson and Schatzman Patent No. 2,352,374 issued June 27, 1944, and assigned to the same assignee as the present invention. Such a fender shield, identified generally by the numeral 10, is especially constructed and arranged for use with a high crowned type of fender 11 which is provided with a forward portion 12 offset inwardly with respect to the rear portion of the fender along a substantially vertical line 13 so as to accommodate an overlapping portion of the rear door (not shown) of the vehicle when the door is closed. In the side wall of the fender 11 is a relatively large opening 14 provided for the usual purpose of permitting access to and removal of the vehicle wheel therethrough, and it is to close this opening that the fender shield 10 is provided. In order to accommodate the relatively offset portions of the fender, a part of each of which portions bounds the access opening 14, the fender shield 10 is provided with corresponding, relatively adjustable offset front and rear portions or sections 15 and 16 respectively.

In assembly, the respective fender shield sections 15 and 16 lie in marginally overlapping relation to the outer face of the fender 11 at the opening 14. The proper location of the fender shield in the assembled relationship with the fender is facilitated by the provision adjacent the opposite ends thereof of connecting means engageable with the fender. Accordingly, the lower front end of the fender shield on the forward, inwardly offset portion 15 is provided with a locating bracket 17 mounted upon a right angularly rearwardly extending lower marginal flange 18 on the fender shield section 15 and having a downwardly offset, forwardly extending engagement arm 19 adapted to underlie the contiguous corner of the fender portion 12. An upstanding retaining flange 20 on the arm 19 engages behind the fender corner and cooperates with the overlapping portion of the fender shield section 15 at the front of the fender to hold the front bottom portion of the fender shield against swinging away from the fender. The fender portion 12 is preferably equipped with a downwardly extending fixed pin 21 to project through a suitable aperture in the arm 19 and function to restrain the fender shield against movement longitudinally in its plane relative to the fender.

At the rear end of the rear fender shield section 16, a right angular inwardly projecting reinforcing flange 22 supports a retaining bracket 23 which, as shown in Fig. 2, extends upwardly therefrom to engage the back of the adjacent lower margin of the fender 11 and cooperate with the contiguous rear overlapping margin of the fender shield section 16 to retain the lower portion of the rear fender shield section 16 against swinging outwardly out of position relative to the fender.

According to the present invention, the fender shield 10 is removably suspended from and locked in position by a novel latch mechanism, generally identified by the numeral 24. As best seen in Fig. 2, the suspending and latching mechanism 24 is preferably disposed in substantially centered relation with respect to the center of mass of the fender shield 10 so as to afford a balance suspension and is carried by the back of the rear fender shield section 16. Both suspension and clamping are effected through the medium of a common element 25, by preference in the form of a vertically elongated sheet metal stamping or plate which is engageable with an inwardly and upwardly curled reinforcing flange 27 forming the upper boundary of the access opening 14 in the fender 11. As best seen in Figs. 3 and 4, the reinforcing flange 27 in the present instance is of substantially hook shape and has its edge upstanding and spaced a substantial distance inwardly from the inner side of the fender. This provides a substantial and sturdy seat for a rabbet-like outwardly extending overhanging engagement shoulder flange 28 on the suspension and clamp member 25. Along the inner edge of the shoulder flange 28, an integral downwardly extending limit and clamping flange 29 engages the adjacent inner side of the flange 27 and is adapted to limit the extent of outward movement of the clamp member 25 relative to the fender when seated upon the reinforcing and retaining flange 27 of the fender, and to serve as the inner element of the clamp when the clamp member 25 and the fender shield are drawn toward one another.

The construction and relationship of the clamp member 25 to the fender shield 10, and more especially the rear fender shield section 16, is such that the clamping member and the fender shield are adapted to be swung open and shut like hinged jaws to receive or release the flanged margin of the fender 11. To this end, the lower end portion of the clamping member 25 is provided with a right angular inwardly extending foot flange 30 seating in nested relation with a similarly directed foot flange 31 on a vertically elongated brace bar or strut 32 attached to the fender shield section 16. As best seen in Figures 3 and 5, the strut foot flange 31 rests flat upon a reinforcing bar 33 carried by the lower reinforcing flange 22 of the fender shield section 16. The foot flanges 30 and 31 are secured together and fixedly to the reinforcing flange 22 and the reinforcing bar 33 by means such as rivets 34.

The strut member 32 extends upwardly in preferably slightly spaced relation to the inner face of the fender shield rear section 16 and has its upper end portion slightly offset outwardly to span the clearance between the strut and the adjacent inner face portion of the fender shield section to engage the latter within a downwardly opening channel provided by a turned over, downwardly extending reinforcing flange 36 along the top edge of the fender shield. Cooperatively related to the upper edge of the strut 32 and in interengagement with the reinforcing flange 36 is means for preventing metal-to-metal contact between the fender and the flange 36, such means comprising a rubber edging 37 which may be on the order of that more particularly covered in Schatzman Patent No. 2,250,136 dated July 22, 1941.

By preference, the strut 32 is somewhat wider than the clamp member 25 so that when the two members are in vertically centered relation, the clamp member 25 will amply clear rather substantial right angularly rearwardly extending reinforcing flanges 38 along the respective longitudinal edges of the strut.

Although the strut 32 is quite rigid and reinforced by the flanges 38 against bending, the clamp member 25 is preferably of a flexible construction, in the present instance at least adjacent its lower end, so that it can be moved on the order of a jaw relative to the upper portion of the strut 32 and thereby of the upper portion of the fender shield, for the purpose of releasing or attaching the fender shield 10 with respect to the fender 11 and for clamping the fender shield in place on the fender. Accordingly, the lower end portion of the clamp member 25 adjacent to the foot flange 30 is formed as a reduced width flexible hinge 39 which takes advantage of the inherent resiliency in the sheet metal of which the clamp member is made to permit a substantial range of flexing of the upper portion of the clamp member 25 toward and away from the strut 32 and well within the elastic limits of the metal. Thus, as seen in Fig. 3, a clamping relationship of the clamp member 25 and the strut 32 is realized in the unflexed condition of the clamp member while, as best seen in Fig. 4, in the open relationship of the latch structure, the clamp member 25 is adapted to be flexed to carry the suspending and clamping shoulders 28 and 29 into substantial spaced relation to the strut 32.

Means for conveniently and efficiently flexing the clamp member 25 are provided and are preferably of such a construction and arrangement as to afford ready manipulation thereof from the outside of the fender shield. Herein such means includes a crank 40 which is preferably in the form of a rod bent to provide the various shapes desired in the crank. The main body portion or shank of the crank 40 extends in longitudinally centered, spaced relation along the inner face of the clamp member 25 and projects upwardly through a bearing aperture 41 in an inwardly extending right angular bearing flange 42 provided therefor on the upper portion of the clamp member.

The bearing flange 42 underlies the horizontal suspending flange 28 and is integrally joined thereto through the medium of the clamping shoulder flange 29 and a connecting offset flange portion 43 which protrudes inwardly a sufficient distance to afford ample clearance for the swinging movement of a crank eccentric 44 provided on the upper terminal or end portion of the crank member 40. By rotating the crank member 40 within the bearing aperture 41 to swing the eccentric 44 in an arc about the axis of the crank shank, a link 45 is actuated to force the clamp member 25 to deflect away from the strut 32 or, on being swung in return to release the clamp member for swinging back to the undeflected position and there draw it into secure clamping relation to the strut 32. For this purpose, a loose bearing connection between the eccentric 44 and the link 45 is effected by having the eccentric project upwardly through a loose bearing aperture 47 in the inner end portion of the link, while the opposite or outer end portion of the link is pivotally connected to a bracket 48 carried fixedly by the strut 32. In a simple and inexpensive construction, the bracket 48 comprises an identical pair of L-shaped sheet metal bracket members 49 having the main flanges thereof in spaced parallel relation to receive the link 45 slidably therebetween and projecting through an aperture 50 provided therefor in the strut 32 so that right angular attachment flanges 51 may be secured, as by welding or the like, to the outer face of the strut and located in the space between the strut and the adjacent inner face of the fender shield rear section 16. A pivot pin 52 connects the link 45 and the bracket 48. Thus it will be seen, that when the crank member 40 is rotated to swing the eccentric 44 from the inner position as shown in Fig. 3 to an outer position as shown in Fig. 4, the link 45 will act to force the strut 32 to back away from the clamp 25 by the shank portion of the crank acting on the bearing flange 42 and the link 45 acting on the strut.

Reinforcement of the bearing flange 42 may be effected by means such as truss embossments 53 formed in the reentrant angle between the body of the clamp member 25 and the bearing flange 42. Vertical downward displacement of the crank relative to the link 45 may be prevented by retaining means on the eccentric 44, such as a cotter pin 54.

Turning of the crank 40 is effected by means such as an integral handle 55 bent to extend at an angle from the lower end of the crank shank and preferably located below the reinforcing flange 22 of the fender shield. Thereby the handle 55 is readily accessible from the outer side of the fender shield and can be grasped and swung to rotate the crank as desired. To stabilize the crank 40 for rotation by means of the handle 55, a loose bearing is provided for the lower portion of the crank shank adjacent to the handle bend by cooperative relationship of the reinforcing flange 22 and the reinforcing bar 33 and the foot flanges 30 and 31. Thus, the reinforcing flange 22 and the bar 33 are formed with coincident inwardly opening bearing slots 57, while the foot flanges 30 and 31 are formed with registering bayonet slots 58, the base ends whereof also register with the bearing slots 57. The mouth ends of the bayonet slots 58 open as shown at 59 in offset relationship to the bearing slots 57 so that after the crank shank is assembled therein and then in the bearing slots 57 to complete the assembly, the crank shank is locked against leaving the slots, and adequate bearing is provided entirely surrounding the crank shank for manipulative purposes.

Arrangement of the handle 55 on the crank 40 is preferably about 90° from the accentric 44, such that when the handle 55 is swung out within a range from right angles to the plane of the fender shield to parallel thereto at one side of the crank axis, the latch 24 is opened for placement or removal of the fender shield, and when the handle 55 is swung back to a position substantially parallel with the plane of the fender shield at the other side of the crank axis, the latch is in clamping position. When the handle is held in the latter position, the latch is held locked against unintentional opening. This locked position is adapted to be maintained by interlocking a flatted upstanding terminal locking tongue 60 on the handle within a locking slot 61 provided therefor in the fender shield lower reinforcing flange 22 and the reinforcing bar 33, substantially as seen in Fig. 5. Release of the locking tongue 60 from the slot 61 is effected by deflecting the handle 55 resiliently downwardly substantially as indicated in broken outline in Fig. 2, as permitted by the inherent resiliency of the handle. Likewise when the handle is to be placed in the locked position, it is deflected down to clear the reinforcing flange 22 and is allowed to snap up into the locking slot 61 where it will remain of its own resilience until wilfully dislodged. Rattling of the handle in the locked position is avoided by forming the tongue with downwardly flaring sides as best seen in Fig. 3, giving it a substantially wedge shape to engage the sides of the locking slot 61 wedgingly.

To stiffen the shank of the crank 40 against torsional strain and also to provide a stop for limiting turning of the crank into extreme open or closed positions, a loop 62 may be formed in the shank, in a plane with the handle 55. By engaging the adjacent face of the clamping member 25 or the adjacent reinforcing flanges 38 on the strut, the stop loop 62 defines the extreme limits of latching and unlatching rotation of the crank.

Figure 7:
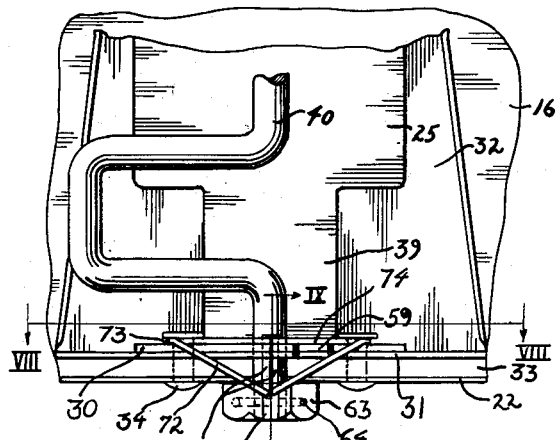
Figure 7 is a fragmentary rear elevational view of the lower portion of a modified latch structure showing a different type of latch operating means.
Figure 8:
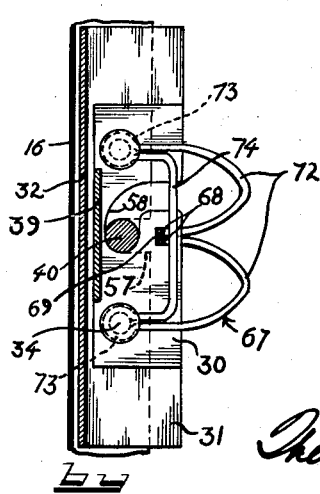
Figure 8 is a horizontal sectional view taken substantially on the line VIII—VIII of Figure 7.
Figure 9:
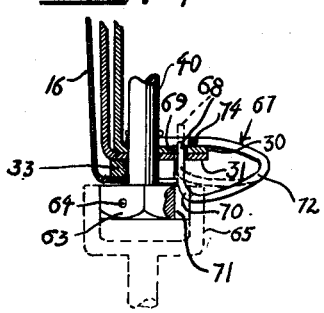
Figure 9 is a vertical sectional view taken substantially along the line IX—IX of Figure 7.

In the modified form shown in Figs. 7, 8 and 9, the crank 40 is provided with wrench operated means instead of a handle for turning the same. Accordingly, the terminal and portion of the crank which projects below the fender shield lower reinforcing flange 22 is equipped with a wrench-engageable head 63. This head may be permanently secured thereto as by means of a pin 64 and is adapted to be engaged by any suitable wrench such as a wheel or socket wrench 65 to turn the crank similarly and with the same effect as the handle 55 previously described.

With the wrench-operated structure, detent means such as a spring detent 67 is preferably employed to lock the latch in clamping position. Accordingly, the spring detent device 67 comprises a one-piece spring element having the terminal portions thereof disposed in vertical juxtaposition to provide interlock fingers 68 projecting upwardly through a suitable guide aperture 69 formed for this purpose in the foot flanges 30 and 31 just inwardly of the shank of the crank 40. The interlock fingers 68 extend from below the foot flange 31 a sufficient distance to engage at their heels 70 within an interlock notch 71 opening radially from one side of the wrench head 63. From the interlock heels 70, spring loops 72 swing inwardly and upwardly and then outwardly to integral attachment loops 73 which encircle the foot flange securing rivets 34 and are respectively secured by the rivet heads to the top face of the foot flange 30. An integral yoke 74 connects the attachment loops 73 and unites the two resilient portions of the spring member into a unitary structure. Through this arrangement, the interlock heels 70 are spring biased for normally assuming the interlocking position within the interlock slot 71 in the wrench head but are adapted to be deflected out of such engagement by pressing the wrench socket 65 against the lower portions of the spring loops 72 at the heels 70 to deflect the same upwardly by compression of the spring loops 72, substantially as indicated in broken outline in Fig. 9. When thus deflected, the heels will ride upon the edge of the wrench socket as the crank is turned and will ride the upper face of the wrench head 63 when the wrench socket is withdrawn, until the crank is turned to the latching position, whereupon the interlock heels 70 automatically snaps back into the interlocked relationship within the interlock slot 71 to hold the crank locked.

In order to adapt the latch mechanism 24 for use with fenders wherein the access opening 14 may be variously dimensioned so that the reinforcing flange 27 may be at various heights, within certain limits, the latch member 25 may be constructed for longitudinal adjustment. To this end, it may be formed in two relatively longitudinally adjustable parts, the upper of which has a slightly inwardly offset lower attachment flange portion 75 formed with a pair of longitudinally extending adjustment slots 77 adjacent the opposite sides thereof and adapted to receive the shanks of securing screws 78 therethrough. The screws 78 are carried by an inwardly offset attachment flange portion 79 on the upper end of the lower part of the clamping member and arranged to be secured in longitudinally adjusted relation to the adjustment flange 75. The inwardly offset relationship of the attachment flanges affords clearnace for the screw heads. Relative slippage of the adjustment flanges 75 and 79 is prevented by interlocking transverse corrugations or serrations 80 on the opposing faces of the flanges. Registering vertical clearance slots 81 may be provided in the adjustment flanges 75 and 79 to accommodate the shank of the crank 40. Vertical reenforcement and guide flanges 82 may be provided to extend right angularly inwardly from the longitudinal edges of the lower portions of the clamp member 25.

Under some conditions of use, it may be desired to make the clamp member 25 of a material or construction that will not readily adapt itself to resilient deflection in the opening and closing of the clamping device. In such case, the lower portion of the clamp member 25 may be provided with a transverse piano type hinge 83 substantially as indicated in Fig. 6 as an alternate construction for the resilient hinge 39.

In mounting the fender shield 10, the crank 40 is first turned to open the latch 24 and the fender shield is then lifted into association with the fender 11 until the end locating brackets 17 and 23, respectively, engage the respective end portions of the fender and the suspending flange 28 of the clamping member 25 engages the top reinforcing flange 24 on the fender. Thereupon merely by turning the crank 40 to close the latch 24 a secure attachment of the fender shield is perfected which, with the crank locked in the latching position will remain permanently until the latch mechanism is again opened by releasing and turning the crank open. The facility with which the fender shield in the present instance can be mounted and demounted is improved by providing an integral upwardly and rearwardly extending camming flange 84 along the forward edge of the suspending shoulder flange 28 so that when the fender shield is lifted up into position the camming flange 84 will automatically cam over the supporting flange 27 on the fender and thus find the seating relationship of the suspending flange 28 on the flange 27. Hence, suspension of the fender shield is effected simply and quickly by an easy upward thrust thereof into position, and the fender shield will then automatically retain the suspended position until the latch meachanism is closed to clamp the fender shield in place, the center of gravity of the fender shield tending to swing it out at the top from the fender into the position indicated in Fig. 4. To release the fender shield from its suspension, a slight inward push or tilting at the top of the fender shield after the latch 24 has been opened will slide the suspension flange 28 rearwardly off of the bearing flange 27 and thus release the fender shield to be lifted away.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A fender and fender shield combination comprising a fender having an access opening, a fender shield adapted to close said opening by lying freely against the outer face of the fender about said opening, means on the respective lower end portions of said fender shield interengageable with the lower portion of the fender at opposite sides of said access opening by an upward sliding movement of the fender shield in its plane along the front face of the fender for locating the lower portion of the fender shield against swinging away from the fender, means carried by the fender interengaging with one of said locating means to retain the fender shield against front to rear movement relative to the fender, a flange on said fender at the top of said access opening and extending inwardly and upwardly at the margin of the fender, and a suspension latch carried by the fender shield and detachably engaging said flange to provide the entire vertical support for the fender shield against dropping away from the fender.

2. In combination in a fender shield structure adapted to be placed in closing relation to the wheel access opening in a fender having an inturned upwardly projecting reinforcing flange at the top of said opening, a fender shield panel, a suspending and clamping member carried by said panel and having adjacent suspending and clamping shoulders engageable with respectively the upper edge and the inwardly facing side of the fender flange, and means for actuating said clamping member to draw said clamping shoulder and said panel toward one another and thus effect a clamping engagement of the panel and the fender, and also operative to release the clamping shoulder by relatively separating the clamping member and said panel.

3. In combination in a fender shield construction, a fender shield panel, an elongated vertically extending strut secured along the inner face of the panel, a substantially coextensively extending suspending and clamping member secured to said strut adjacent the lower end portion of the strut, means operable to move the upper end portion of the suspending and clamping member toward and away from the strut, means on said upper end portion of the clamping and suspending member for suspending and clamping engagement with a flanged fender margin, a crank operatively associated with said suspending and clamping member, and a connecting linkage between the crank and strut operative upon rotation of the crank to effect deflection and retraction of the upper end portion of said suspending and clamping member.

4. In combination in a fender shield structure, a fender shield panel, means for clamping said panel to a fender including a member adapted to be associated with the marginal portion of a fender adjacent the top of a wheel access opening in the fender to effect clamping of the fender shield panel against the fender, means for actuating said clamping means including a crank having an eccentric movable relative to and connected with said clamping means and with the panel adjacent to the upper margin of the panel and having means adjacent the lower margin of the panel for effecting rotation thereof, and means cooperative with said rotation effecting means for locking the crank against rotation when clamping has been effected.

5. In combination in a fender shield structure, a fender shield panel having a portion with a slot therein, and means for effecting a clamping relationship of the fender shield panel with a fender including an operating crank having a handle formed with an interlock projection engageable in said slot for locking the crank against rotation in one operative position thereof.

6. In combination in a fender shield construction, a panel structure, means for clamping the panel structure to a fender including a crank, one end of the crank being equipped with a wrench-engageable head, and releasable detent means interlockingly engageable with said head in one position of the head, a portion of the detent means being located for engagement and release from the head by an actuating wrench applied to said head for the purpose of turning the crank.

7. In combination in a fender shield construction, a fender shield panel, and a vertically elongated clamping member cooperative with the upper portion of the fender shield panel for clamping the latter onto a fender, said member being secured fixedly adjacent to the lower margin of the fender shield panel and having an integral flexible lower portion for hinged flexure of said member so that the upper clamping portion thereof can move toward and away from said panel.

8. In combination in a fender shield construction, a fender shield panel, a vertically extending clamping member cooperatively related to the inner side of the fender shield panel, means for relatively actuating the upper portion of said clamping member and the adjacent portion of the fender shield panel for movement toward and away from one another, said clamping member comprising upper and lower adjustably related portions adapted for adjusting the length of said member.

9. In combination in a fender shield construction, a fender shield panel, a vertically elongated clamping member having an upper portion clampingly related to the upper portion of the fender shield panel and a lower portion secured to the lower portion of the panel, said clamping member portions being adjustably connected for adjusting the length of said clamping member, said lower portion of the clamping member having a hinge structure for movement of the clamping member into and out of clamping position.

10. In combination in a fender shield construction, a fender shield panel, a vertically elongated strut secured adjacent to the upper and lower margins of the panel, a vertically elongated clamping member secured at its lower end to said strut and having the upper end portion thereof movable toward and away from the strut and formed with a suspending and clamping flange structure adapted to interengage with a reinforcing flange along the upper margin of a wheel access opening on a fender, a bearing flange on said member below said suspending and clamping flange structure, an operating crank extending vertically along the inner side of said clamping member and having bearing engagement with said bearing flange, an eccentric on said crank above said bearing flange and below said suspending and clamping flange structure, and a link connecting said eccentric to the strut and operative to move the clamping member to carry said suspending and clamping flange structure into and out of clamping relationship relative to the strut upon rotation of the crank.

11. In combination in a fender shield construction, a fender shield panel, a member located adjacent to the edge of the fender shield for effecting clamping engagement with a fender and mounted for relative movement into and out of clamping position, a crank carried by the fender shield having an eccentric portion adjacent to said clamping means, and connecting structure between the crank and the fender shield panel on one hand and the crank and the clamping means on the other hand operative in the rotation of the crank and swinging of the eccentric to effect said relative movement into and out of clamping position of the clamping means.

12. In a fender and fender shield combination, a fender having a wheel access opening, a fender shield for closing said opening by lying freely against the outer face of the fender about said opening, means adjacent to the inside of the upper margin of the fender shield for engaging the fender and providing the sole support for the fender shield, means for effecting an interconnection between the opposite lower corners of the fender shield and the fender, to hold the lower part of the fender shield against swinging away from the fender, said last mentioned means including a bracket carried by the fender shield and having a hole therein, and a downwardly projecting pin carried by the fender and engageable in the hole in said bracket in response to an upward movement of the fender shield in assembling the same with the fender, whereby the fender shield is held against horizontal movement relative to the fender.

13. In combination in a fender and fender shield assembly, a fender having a wheel access opening to be closed by the fender shield, a fender shield panel having means thereon for suspending the fender shield from the fender at the upper margin of the wheel access opening, means on the lower part of the fender shield including a bracket having an opening therein and cooperative with the fender in holding the fender shield in place against horizontal movement, and a pin projecting from the fender and interengageable with the bracket for positively effectuating the holding of the fender shield against said horizontal movement.

14. In combination in a fender shield construction, a panel structure, means for securing the panel structure to a fender including a rotatable member having a wrench-engageable head, said head having a notch therein, and spring detent means interlockingly engageable within said notch in the head in one position of the head to hold the rotatable member stationary, said spring detent means including a portion engageable by a wrench applied to said head for displacement of the spring detent means from said notch to free the head and rotatable member for rotation.

15. In a fender shield assembly, in combination, a fender shield panel, a clamping member vertically elongated and mounted on the panel at the back thereof and adjacent to the lower margin of the panel and extending upwardly therefrom, said clamping member having a clamping portion adjacent to the upper margin of the panel, said clamping portion and the upper portion of the panel being relatively movable about an axis of movement spaced below said clamping portion toward and away from one another into and out of clamping relation to the margin of a fender interposed therebetween, the axis of movement being located adjacent to the bottom margin of the panel, and means for effecting such relative movement having operative connection between the panel and the clamping member.

16. In combination, a fender member having a wheel access opening, a fender shield member closing said opening, one of said members having a pin fixedly mounted on the lower margin thereof and extending therefrom to a substantial distance downwardly adjacent to a lower corner of said wheel access opening, the other of said members having a bracket extension on the lower margin thereof and including an aperture receptive of said pin, interengagement of said pin and bracket extension being accomplished by an upward bodily assembly movement of the fender shield member into position on the fender member.

17. In combination in a fender shield construction, a panel having a lower inturned flange, means for securing the fender shield to a fender including a rotatable member having a wrench-engageable head on the lower portion thereof, said rotatable member being rotatably bearinged in said flange, said head having a notch in the side thereof, a spring detent member including a loop portion secured above said flange and extending inwardly and downwardly adjacent thereto, said loop having a terminal portion engaging in said notch and projecting upwardly therefrom, and means affording an aperture serving as a guide for said terminal portion above said head and into which said terminal portion projects, said loop being flexible under the influence of a wrench applied to said head and forced upwardly for displacing said terminal portion from said notch to free the head and rotatable member for rotation by the wrench.

18. In combination in a fender shield construction including a panel having a lower inturned flange and a rotatable member for securing the fender shield in position on a fender and having a portion bearinged in said flange with a wrench head at the lower end thereof below said flange, said head having a notch in one side thereof, and spring interlock means including a pair of spring loops supported above said flange and extending rearwardly and downwardly relative thereto and having terminal interlock portions projecting upwardly and extending interlockingly into said notch, said spring loops being flexible in response to wrench applied pressure by a wrench engaging said head for releasing said terminal portions from the notch and thereby freeing the head and rotatable member for rotation.

19. In combination in a fender shield construction including a panel having a lower inturned flange and a rotatable member for securing the fender shield in position on a fender and having a portion bearinged in said flange with a wrench head at the lower end thereof below said flange, said head having a notch in one side thereof, spring detent means including a pair of spring loops supported above said flange and extending rearwardly and downwardly relative thereto and having detent terminal portions projecting upwardly and extending interlockingly into said notch, said spring loops being flexible in response to wrench applied pressure by a wrench engaging said head for releasing said detent terminal portions from the notch and thereby freeing the head and rotatable member for rotation, and means defining a guide structure for said terminals in reciprocation thereof under flexure and release by the wrench.

20. In combination in a fender shield construction, a panel structure, means for securing the fender shield to a fender including a rotatable member and bearing means supported by the lower portion of the panel structure, the rotatable member having a wrench-engageable head thereon below said bearing structure, said head having a notch in one side thereof, and a spring detent structure comprising a pair of spring loops projecting inwardly and downwardly from said bearing structure and having detent portions resiliently supported by the loops and engaging interlockingly in said notch in one position of the head to hold the rotatable member stationary, each of said loops being integrally connected to an attachment loop secured to said bearing structure and the attachment loops being integrally connected together by a yoke portion, said resilient loops being resiliently yieldable in response to pressure by a wrench applied to said head for displacement of the detent portions from said notch to free the head and rotatable member for rotation.

21. In combination in a fender shield construction, a panel structure, means for securing the panel structure to a fender including a rotatable member having a wrench-engageable head, said head having a notch therein, and spring detent means interlockingly engageable within said notch in the head in one position of the head to hold the rotatable member stationary, said spring detent means including a portion engageable by a wrench applied to said head for displacement of the spring detent means from said notch to free the head and rotatable member for rotation, said head having a generally axially facing surface engageable by said spring detent means after the head has been turned out of said one position whereby to maintain the spring detent means displaced until the head is rotated back to said one position.

GEORGE W. SCHATZMAN.

REFERENCES CITED

The following references are of record in the file of this patent:

UNITED STATES PATENTS

| Number | Name | Date |
| --- | --- | --- |
| 602,262 | La France | Apr. 12, 1898 |
| 2,048,862 | Haltenberger | July 28, 1936 |
| 2,070,230 | Harroun | Feb. 9, 1937 |
| 2,215,619 | Patrick et al. | Sept. 24, 1940 |
| 2,222,610 | Fergueson | Nov. 26, 1940 |
| 2,222,619 | Jandus | Nov. 26, 1940 |
| 2,222,625 | Mills | Nov. 26, 1940 |
| 2,288,725 | Lyon | July 7, 1942 |
| 2,309,724 | Wohlfield | Feb. 2, 1943 |
| 2,334,867 | Fergueson | Nov. 23, 1943 |
| 2,336,545 | Jandus | Dec. 14, 1943 |
| 2,353,553 | Fergueson | July 11, 1944 |

FOREIGN PATENTS

| Number | Country | Date |
| --- | --- | --- |
| 327,903 | Great Britain | Apr. 17, 1939 |